(12) United States Patent
Appel

(10) Patent No.: US 6,440,313 B1
(45) Date of Patent: Aug. 27, 2002

(54) WATER PURIFICATION PLANT

(76) Inventor: Peter Willem Appel, Prinses Julian Alaan 79, Rotterdam (NL), 3962 DG (*) Notice: Subject to any disclaimer, the term of this patent is extended or adjusted under 35 U.S.C. 154(b) by 0 days.

(21) Appl. No.: 09/713,825

(22) Filed: Nov. 15, 2000

Related U.S. Application Data

(63) Continuation-in-part of application No. 09/586,110, filed on Jun. 2, 2000, now abandoned.

(30) Foreign Application Priority Data

Jun. 2, 1999 (NL) .................................. 1012217

(51) Int. Cl.[7] .............................. C02F 1/32; C02F 1/72; C02F 1/78; E04H 4/16
(52) U.S. Cl. ...................... 210/748; 210/758; 210/759; 210/760; 210/169; 210/199; 210/253; 210/254
(58) Field of Search .............................. 210/169, 198.1, 210/199, 205, 252, 253, 258, 259, 416.2, 748, 753–756, 758–760

(56) References Cited

U.S. PATENT DOCUMENTS

| | | | |
|---|---|---|---|
| 3,661,262 A | * | 5/1972 | Sanders |
| 4,029,578 A | * | 6/1977 | Turk |
| 4,179,616 A | * | 12/1979 | Coviello et al. |
| 4,230,571 A | * | 10/1980 | Dadd |
| 4,416,786 A | * | 11/1983 | Knorre et al. |
| 4,592,841 A | * | 6/1986 | Ancelle et al. |
| 4,865,749 A | * | 9/1989 | Yoshida |
| 5,024,766 A | * | 6/1991 | Mahmud |
| 5,114,576 A | * | 5/1992 | Ditzler et al. |
| 5,174,904 A | * | 12/1992 | Smith, II |
| 5,190,659 A | | 3/1993 | Wang et al. |
| 5,266,215 A | * | 11/1993 | Engelhard |
| 5,424,032 A | | 6/1995 | Christensen et al. |
| 5,460,702 A | * | 10/1995 | Birkbeck et al. |
| 5,632,890 A | * | 5/1997 | Sugimoto |
| 5,711,887 A | * | 1/1998 | Gastman et al. |
| 5,785,845 A | * | 7/1998 | Colaiano |
| 6,129,850 A | * | 10/2000 | Martin et al. |

FOREIGN PATENT DOCUMENTS

| | | |
|---|---|---|
| DE | 94 15 140.7 | 12/1994 |
| EP | 0 027 278 | 4/1981 |
| EP | 0 572 975 | 12/1993 |
| FR | 2 726 309 | 5/1996 |

OTHER PUBLICATIONS

Database WPI, Week 9913, Derwent Publications Ltd. London, "Cleaning Water in Swimming Pool", Dec. 11, 1989. Copy of Abstract in English Se 8 802 180 A (EKA Nobel Ab).

* cited by examiner

*Primary Examiner*—David A. Simmons
*Assistant Examiner*—Fred Prince
(74) *Attorney, Agent, or Firm*—Baker Botts LLP

(57) ABSTRACT

A water purification plant for a swimming pool is provided with a filtering apparatus having a filtering circuit in which a filter and a pump are incorporated and via which water from the swimming pool can be circulated. In a further circuit arranged parallel to at least a part of the filtering circuit, a UV reactor is incorporated. Further, supply members for an oxidizing and disinfecting agent are present. The oxidant in the UV reactor is introduced into the water flowing through said reactor.

17 Claims, 1 Drawing Sheet

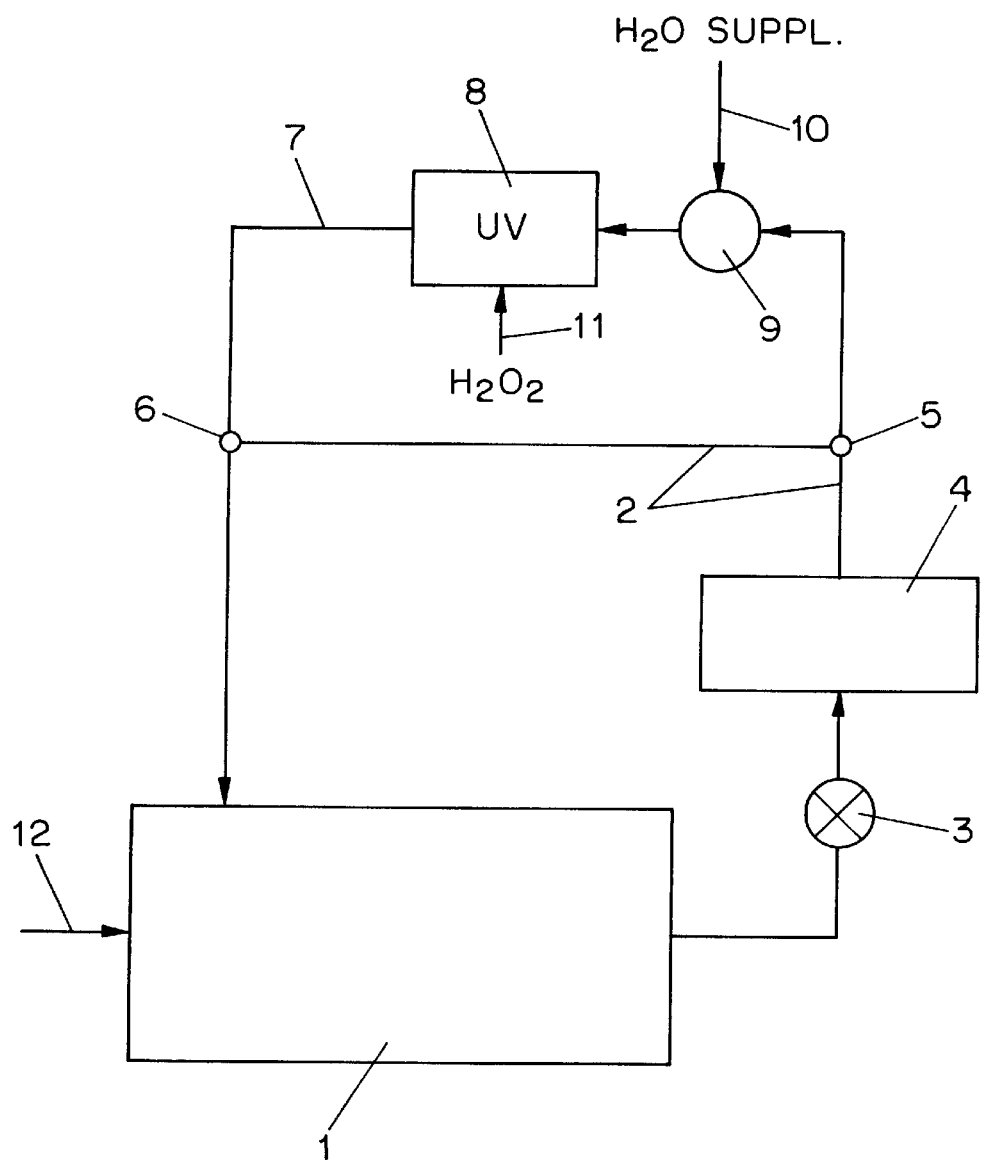

WATER PURIFICATION PLANT

This is a continuation-in-part of application Ser. No. 09/586,110 filed Jun. 2, 2000 abandoned.

The present invention relates to a water purification plant for a swimming pool, provided with a filtering apparatus having a filtering circuit in which a filter and a pump are incorporated and via which water from the swimming pool can be circulated, and with a further circuit which is arranged parallel to at least a part of the filtering circuit and in which a UV reactor is incorporated, and with supply members for an oxidizing and disinfecting agent. The further circuit can be arranged parallel to the entire filtering circuit as well as to only a portion thereof, while the parallel circuit can further terminate in the filtering circuit itself as well as in its own connection to the swimming pool.

Such water purification plants are known. Typically, chlorine or chlorine compounds are added to the water in the swimming pool. Apart from acting as disinfectant, chlorine has an oxidizing action. It reacts both to humic acids in the make-up water, involving the formation of chlorinated organic hydrocarbons, and to organic components such as urea, creatinine and the like, introduced into the water by swimmers, involving the formation of chloramines. For that reason, apart from the amount of chlorine required for disinfecting, an additional amount of chlorine usually has to be added to compensate for the oxidizing or chlorinating action of the chlorine. In order to limit the addition of chlorine, because of the undesired formation of chlorinated organic hydrocarbons and chloramines, it has earlier been proposed to have the oxidation take place by means of ozone. Since this is a toxic gas whose remainders still have to be removed separately, the use thereof causes great problems in practice. Moreover, in that case, chlorine for disinfecting the pool water has to be added nevertheless.

Further, there is known a purification of pool water where the UV reactor is not incorporated in a separate parallel circuit, but in the filtering circuit, while, also, the organic components are oxidized by means of hydrogen peroxide, while disinfection is effected by means of the UV reactor. Although at high concentrations, hydrogen peroxide may serve as oxidizing and disinfecting agent, and a UV reactor would even be superfluous, such high concentrations in the swimming pool water are highly undesirable, in particular for swimmers. However, at low concentrations, insufficient oxidation as well as insufficient disinfection takes place. A possible solution could be provided by causing the residence time of the circulating water in a hydrogen peroxide reactor incorporated in the filtering circuit to be very long and causing the residence time in the swimming pool to be very short. However, this meets with practical drawbacks, since such hydrogen peroxide reactor would have to be particularly large, which would involve unacceptably high costs.

The use of the combination of a UV reactor and ozone as oxidant in a water purification plant as described in the preamble is also known per se. In that case, air is fed into the UV reactor, from which, under the influence of the UV radiation, ozone is obtained in situ; the ozonized air is passed through the water flowing through the UV reactor. However, the oxidizing action hereof proves to be very slight.

The object of the invention is to remove the abovementioned drawbacks, or at least to reduce them to a considerable extent, and to provide a water purification plant wherein, in an efficient manner, both an oxidation of organic compounds introduced into the water and a sufficient disinfection of the water is obtained, while this no longer requires the addition of chlorine or other undesired substances in high concentrations, although this may in fact be desired sometimes, in particular in the case of an insufficient disinfection.

To realize this object, in a first embodiment, the water purification plant as described in the preamble is characterized in that the oxidant in the UV reactor is introduced into the water flowing through this reactor.

In a second embodiment, relating to a water purification plant for a swimming pool, provided with a filtering apparatus having a filtering circuit in which a filter and a pump are incorporated and via which water from the swimming pool can be circulated, this object is realized in that in the filtering circuit, a TV reactor is incorporated, while further, supply members for an oxidizing and disinfecting agent are present, the oxidant in the UV reactor being introduced into the water flowing through said reactor, and supply members for an additional disinfectant, such as chlorine, all types of chlorine compounds and silver salts, etc.

The oxidant is introduced into the UV reactor into the water flowing through this reactor. This can take place in the UV reactor itself, but also in the further circuit therefor, i.e. after the division in the filtering circuit. This may involve the addition of an excess of oxidant to the water; indeed, because the water, after having passed through the further conduit, is mixed with the water from the filtering circuit, while the oxidant concentration can be substantially reduced by dilution, swimmers will yet not be troubled by the added oxidant. Preferably, an oxidant is used whose oxidizing action is promoted under the influence of UV radiation.

Further advantages of the water purification plant according to the invention reside in the fact that the discharged water contains fewer chlorinated compounds, which renders the various organic compounds more readily biodegradable, while, further, less make-up water needs to be added. These advantages mean a lesser burden to the environment.

Instead of passing in situ-formed ozone through the water, which yields a poor oxidation, a direct supply of an oxidant to the water is particularly favorable. In that respect, it is important that the oxidant be water-soluble, i.e. sufficiently soluble to effect an efficient oxidation.

In particular, on the outlet side of the filter, a distribution element is present, via which a fraction $(1-\alpha)$ of the pool water, wherein $\alpha$ lies approximately in the interval of from 0.03 to 0.5, more in particular from 0.05 to 0.2, and is preferably about 0.1, is directly returned over the filter conduit to the swimming pool and the rest of the pool water is returned to the swimming pool over the further circuit with the UV reactor. By subjecting, for instance, only 0.1 of the amount of circulated water to a direct oxidation, a very high concentration of oxidant can be introduced into the further circuit. After that, a dilution with 0.9 part of the circulated water takes place.

Further, it is particularly favorable when in the further circuit, on the inlet side of the UV reactor, make-up water is introduced. Indeed, when makeup water has to be added, as is necessary in practice, this will preferably take place where the high concentration of oxidant is added, because of the humic acids present in the make-up water.

As stated, through the features according to the invention, high concentrations of oxidant can be used without swimmers in the pool being troubled thereby. The concentration of active oxygen equivalents of the added oxidant will then be higher than the concentration of active oxygen equivalents of oxidizable organic compounds which is averagely introduced into the pool water by make-up water and by swimmers. In this respect, it is favorable when the concentration of active oxygen equivalents of the added oxidant (which can, for instance, be determined by means of potassium permanganate) is higher by a factor 2 to 100 and in particular 2 to 20, than the concentration of active oxygen equivalents of oxidizable organic compounds which is averagely introduced into the pool water by make-up water and by swimmers. In this manner, due to the high concentration of the oxidant in the second filtering circuit, an optimal oxidation of the oxidizable organic compounds introduced into the pool water is obtained, while this process proceeds considerably faster than in the case where the UV reactor were included in the first filtering circuit and the oxidant were injected therein. Further, in connection with the set UV radiation intensity, a disinfection (bacteriological equilibrium situation) can be realized.

Preferably, the oxidizing and disinfecting agent is formed by a peroxide compound, in particular hydrogen peroxide. Moreover, additionally, to meet any legal requirements concerning a prescribed degree of disinfection, a disinfectant, such as chlorine, all types of chlorine compounds and silver salts, etc., can further be added via means present for that purpose.

The invention will be specified with reference to the accompanying FIGURE, which schematically shows the water purification plant according to the invention.

The FIGURE shows a swimming pool 1 having a filtering circuit 2 incorporating a pump 3 and a filter 4. Arranged parallel to a part of this filtering circuit 2, via distributing elements 5 and 6, is a further circuit 7, which circuit 7 incorporates a UV reactor 8 and means 9 for the supply of make-up water over the conduit 10. The UV reactor 8 comprises an injector via which an oxidant, supplied over a conduit 11, is introduced into the water flowing through the UV reactor. As oxidant, hydrogen peroxide is opted for. Further, the arrow 12 indicates the conduit via which an additional amount of a disinfectant can be added to the swimming pool water.

EXAMPLE

It is assumed that via the distributing element, 0.1 part of the circulated amount of water is passed through the circuit 7 and 0.9 part hereof is passed through the filtering circuit 2.

When it is assumed that averagely, per swimmer, about 2 $m^3$ should be circulated over a day of 8 hours, and that per day, 500 swimmers use the swimming pool, the total water circulation flow rate is 125 $m^3$/hour, so that the flow rate of the water flowing through the circuit 7 is 12.5 $m^3$/hour and that of the water that is directly returned to the pool is 112.5 $m^3$/hour.

If it is further assumed that averagely, not considering the supply of make-up water, about 0.2 g of active oxygen equivalents of oxidizable organic compounds is introduced into the water per swimmer over a day of 8 hours, this is about 12.5 g/hour for 500 swimmers per day. This means that in the UV reactor, at least 1 $g/m^3$ of oxidizable organic compounds has to be oxidized in order to keep the concentration thereof in the pool constant. Through the addition of an excess of hydrogen peroxide at the inlet of the UV reactor, for instance 10–20 g/hour, there is realized at the inlet of the UV reactor a hydrogen peroxide concentration of 10–20 $g/m^3$ or 10–20 mg/liter—assuming that no notable decomposition of hydrogen peroxide takes place in the further circuit and the pool—and a virtually optimal oxidation of the oxidizable organic compounds introduced into the water by the swimmers proves to be possible in about 0.5 hour, while the concentration of the hydrogen peroxide in the swimming pool is sufficiently low for the swimmers not to be troubled thereby. To achieve a disinfecting situation under these conditions, apart from the amount of hydrogen peroxide required for optimal oxidation of said organic compounds, a relatively slight amount of chlorine should be added. Typically, this is even prescribed by law. Upon decomposition of hydrogen peroxide in the further circuit and in the pool, a compensation should be provided therefor in the dosing of the hydrogen peroxide.

The invention is in no way limited to the embodiment represented hereinabove, which shows the water purification plant only schematically, and not to the exemplary embodiment here described. The invention comprises all possible modifications hereof, of course in so far as they fall within the protective scope of the following claims.

What is claimed is:

1. A water purification plant for a swimming pool, provided with a filtering apparatus comprising
    a filtering circuit, the filtering circuit having a filter and a pump incorporated therein and through which water from the swimming pool can be circulated,
    a further circuit being arranged parallel to at least a part of the filtering circuit, the further circuit having a UV reactor and supply members for supplying an oxidizing and disinfecting agent to the water, and
    a distribution element provided at an outlet side of the filter through which about 90% of the water is directly returned over the at least a part of the filter circuit to the swimming pool, and a remainder of the water is returned to the swimming pool over the further circuit.

2. A water purification plant according to claim 1, wherein the UV reactor introduces an oxidant having a concentration of active oxygen equivalents higher than a concentration of active oxygen equivalents of oxidizable organic compounds which are averagely introduced into the pool water by make-up water and by swimmers.

3. A water purification plant according to claim 2, wherein the concentration of active oxygen equivalents is higher by a factor of 2 to 100 than the concentration of active oxygen equivalents of oxidizable organic compounds which are averagely introduced into the pool water by make-up water and by swimmers.

4. A water purification plant for a swimming pool provided with a filtering apparatus comprising
    a filtering circuit, the filtering circuit having a filter and a pump incorporated therein and through which water from the swimming pool can be circulated,
    a further circuit which is arranged parallel to at least a part of the filtering circuit, the further circuit comprising a UV reactor and supply members for supplying an oxidizing and disinfecting agent to the water, wherein at least one of the supply members is provided for supplying an oxidizing agent to water in the further circuit flowing through the UV reactor.

5. The water purification plant according to claim 4, wherein the at least one of the supply members is provided for supplying a water-soluble oxidizing agent.

6. The water purification plant according to claim 4, further comprising a distribution element at an outlet side of the filter through which a fraction of the water is returned directly through the at least a part of the filtering circuit to the swimming pool, and a remainder fraction of the pool water is returned to the swimming pool through the further circuit.

7. The water purification plant according to claim 6, wherein the fraction of the pool water ranges from 0.97–0.5.

8. The water purification plant according to claim 6, wherein the fraction of the pool water ranges from 0.95–0.8.

9. The water purification plant according to claim 6, wherein the fraction of the pool water is 0.9.

10. The water purification plant according to claim 4, further comprising means for introducing make-up water in the further circuit at the inlet side of the UV reactor.

11. A method for purifying water containing oxidizable organic material, comprising:

pumping the water through a filtering circuit and through a further filtering circuit, the further filtering circuit being arranged in parallel to at least a part of the filtering circuit, disinfecting the water in the further filtering circuit with a UV reactor, oxidizing the water in the further filtering circuit with an oxidizing agent, wherein the oxidizing agent is added in an amount whereby a concentration of active oxygen equivalent of the oxidizing agent is higher than a concentration of active oxygen equivalents of the oxidizable organic material in the water.

12. The method according to claim 11, wherein the concentration of the active oxygen equivalent of the oxidizing agent is from 2–100 times higher than the concentration of the active oxygen equivalents of the oxidizable organic material in the water.

13. The method according to claim 11, wherein the concentration of the active oxygen equivalent of the oxidizing agent is from 2–20 times higher than the concentration of the active oxygen equivalents of the oxidizable organic material in the water.

14. The method according to claim 11, wherein the oxidizing agent is a peroxide compound.

15. The method according to claim 14, wherein the peroxide compound is hydrogen peroxide.

16. The method according to claim 11, further comprising disinfecting the water in the further filtering circuit with a disinfecting agent.

17. A method for purifying water containing chlorinated organic material, comprising:

pumping the water through a filtering circuit and a further filtering circuit arranged in parallel to at least a part of the filtering circuit, disinfecting the water in the further filtering circuit with a UV reactor, oxidizing the water in the further filtering circuit with an oxidizing agent, wherein the oxidizing agent is added in an amount whereby a concentration of active oxygen equivalent of the oxidizing agent is higher than a concentration of active oxygen equivalents of the chlorinated organic material in the water.

* * * * *